Aug. 29, 1933.   E. VAN HOOFSTADT   1,924,264
MATCH MAKING MACHINE
Filed Jan. 12, 1927   8 Sheets-Sheet 3

INVENTOR.
Edward Van Hoofstadt
BY
ATTORNEYS.

Aug. 29, 1933.  E. VAN HOOFSTADT  1,924,264
MATCH MAKING MACHINE
Filed Jan. 12, 1927    8 Sheets-Sheet 5

INVENTOR.
Edward Van Hoofstadt
BY Cornelius Zabriski
ATTORNEYS.

Aug. 29, 1933.  E. VAN HOOFSTADT  1,924,264
MATCH MAKING MACHINE
Filed Jan. 12, 1927  8 Sheets-Sheet 6

Fig.10

INVENTOR
Edward Van Hoofstadt
BY
ATTORNEYS.

Aug. 29, 1933.  E. VAN HOOFSTADT  1,924,264
MATCH MAKING MACHINE
Filed Jan. 12, 1927  8 Sheets-Sheet 8

INVENTOR.
Edward Van Hoofstadt
BY Cornelius Zabriskie
ATTORNEYS.

Patented Aug. 29, 1933

1,924,264

UNITED STATES PATENT OFFICE 1,924,264

MATCH MAKING MACHINE

Edward Van Hoofstadt, Oceanside, N. Y., assignor to Lion Match Co., Inc., Long Island City, N. Y., a Corporation of New York Application January 12, 1927. Serial No. 160,575

29 Claims. (Cl. 144—51)

This invention relates to match making machinery, and is more particularly directed to a machine for preparing book match combs for dipping and for subsequently dipping and drying them.

It is well understood in this art that in order to properly dip match combs or cards, the splints or teeth of the comb must first be alternately offset, so as to separate the free ends of the splints for an appreciable distance, and thereafter the free ends of such splints are dipped into paraffine, after which they are dipped into a striking composition which forms the heads of the matches. Thereafter the striking material is permitted to dry to form a hard, completed head. The machine of this invention is adapted to receive the cards after they have been slit to form the teeth or splints but before said splints are alternately offset and by progressive operations, the present machine is constructed to alternately offset said splints, to thereafter feed them through paraffining and heading operations and after a subsequent drying operation, the machine is adapted to discharge the cards in a condition wherein they can be cut into suitable lengths and incorporated in finished match book construction.

The method employed in the past in the making of match combs is to cut the combs and simultaneously alternately offset the splints thereof, the combs being thereafter positioned within a suitable frame and paraffined and headed. It has also been suggested to simultaneously cut and offset the combs and thereafter mount them on a conveyor, whereby they are caused to travel through the paraffining and heading operations.

In accordance with this invention in its preferred form, however, the combs are cut to form the splints, but the splints are not offset during the cutting operation, so that the combs are perfectly flat, when they are fed to the machine of this invention. This machine offsets the splints and thereafter dips them. The advantage of this mode of handling the combs permits the machine to be operated at a much higher speed than heretofore possible and materially increases the capacity of mechanism for paraffining and heading match cards.

The primary object of the invention is to provide a machine which will materially increase the output of match combs and this is accomplished in the manner hereinafter more fully described.

The invention embodies numerous improvements over prior match making machinery and among the novel features of the invention, attention may be called to the following which are important though not exclusive.

The machine of this invention embodies a traveling conveyor of novel construction and which conveyor comprises a plurality of novel comb carriers having match card clips, which are adapted to support and carry combs through the paraffining and heading operations and through the subsequent drying operation. Where conveyors have heretofore been used for this purpose, it has been the practice to feed the combs to the consecutive comb clips of the conveyor in succession, and the conveyor can be operated no faster than the combs can be fed thereto. By the present invention, in contradistinction, I feed the conveyor at different points and instead of feeding at any particular point to the comb clips in succession, the carrier is run at a faster speed so that the feed in any particular point is accomplished by skipping one or more clips, the clips thereby skipped being filled in as they pass another or other feeding stations. In other words, I feed the conveyor from a number of feeding stations, which collectively operate to feed such a conveyor much faster than has heretofore been possible and I am thereby enabled to correspondingly speed up the conveyor and obtain a corresponding increase in output of the machine. This feature of the invention is broadly novel in match making machinery and it is not limited in its application to employment in conjunction with the other features of the invention which will be presently described.

In the preferred form of the invention, the greater portion of the conveyor travels at a uniform and constant speed, but that portion thereof to which the match combs are being fed is adapted for intermittent movement. In other words, while the greater portion of the conveyor travels constantly, that portion thereof contiguous to the comb feeding devices is adapted for alternate periods of rest and movement. During periods of rest, match combs are fed to the conveyor and during intermediate periods of movement, the conveyor is shifted to position it to receive additional combs. I am enabled to accomplish this result by looping the conveyor in advance of and beyond the feeding devices and as the portion of the conveyor contiguous to the feeding devices is relatively short, no mechanical difficulties are found to interfere with the intermittent movement of the conveyor at this point. I therefore obtain all the advantages of intermittent movement at the feeding stations, while obviating the disadvantages of intermittent movement of the entire conveyor. This allows the conveyor to be operated at greater speeds than heretofore and materially increases the output of matches.

Another feature of the invention is inherent in the conveyor construction. This construction, in the preferred form of the invention, is unusually simple and consists in a number rigid bars, the opposite ends of which are associated with conveyor chains and with each of which bars cooperates a plurality of springs clips, so constituted as to clamp match cards to the exterior of the bars in an entirely automatic manner, as the cards are brought into cooperative relation with such clips. By these clips, the cards are carried with the conveyor through the paraffining and heading operations and brought to the point of discharge of the machine, whereat they are automatically ejected from the clips by novel ejector mechanism constituting a further feature of the invention.

In offsetting the teeth of the match combs, it is found convenient to offset alternate teeth leaving the intermediate teeth in the plane of the uncut portion of the comb. By manipulating the comb in this manner, much simpler mechanism can be employed than would be necessary with the offsetting of successive teeth in opposite directions. However, when a comb is offset in the manner described, the comb must be supported upon the conveyor, so that during the paraffining and heading operations, all of the splints or teeth will be submerged to the same extent in the paraffine and heading solution. For this reason, the comb or card clips are constructed to support the combs in slightly inclined positions, so that the free ends of all of the splints depend for the same distance below the conveyor. Thus, as the splints are dipped into the paraffining and heading solution in succession, they are all immersed to the same degree and uniform dipping and heading results, as will be hereinafter more fully described.

In the paraffining and heading of match combs, it is found that the time during which the splints should be submerged in the paraffining and in the heading solution should vary with differences in temperature, conditions of the paper, etc. Due regard has not been given to these variations in conditions, but the present invention provides simple and efficient means for accurately regulating and determining the time of submersion of the splints in both the paraffining and the heading solution in order that maximum efficiency may be obtained in the carrying out of these operations.

The mechanism by which the combs are ejected from the conveyor is so constituted that it automatically compensates for variations found in the length of the conveyor within relatively wide limits. It is well understood that conveyors of the character under consideration undergo, by expansion, contraction, stretching, or wear, pronounced changes in length which makes it extremely difficult to preserve proper cooperative relation between ejector mechanism and the comb carrying devices of such a conveyor. The present invention provides novel and efficient ejector mechanism which will positively compensate for irregularities in the conveyor in an entirely automatic manner.

A further feature of the invention consists in the provision of means whereby the degree or extent to which alternate teeth of the combs are offset may be regulated, so that such combs are offset to just the right extent necessary to give the best results under varying changes in the material operated upon and in atmospheric changes. The mechanism for accomplishing this result is simple in construction and thoroughly efficient in its operation.

In the preferred form of the machine of this invention, the combs are fed to the receiving end of the machine in flat form and are stacked in a suitable magazine from which they are fed successively to means for alternately offsetting the splints of the comb. This feeding is accomplished by novel means whereby the combs are successively fed into a position to be offset, and the mechanism is so constructed that while the machine directly operates upon the combs during this feeding operation, the subsequent feeding operation of moving the combs into cooperative relation with the conveyor is accomplished through force applied by the moving of the next comb into cooperative relation with the offsetting means. In other words, the combs are not fed directly from the magazine to the conveyor, but are fed to the offsetting means and are thereafter fed to the conveyor by distinct operations, during the latter of which the comb to be next offset is utilized to move the previously offset comb into the grip of the conveyor clips. It is found in practice that this manner of manipulating the comb greatly simplifies the construction of the machine which operates with high efficiency when so constituted.

It is of course essential that the slit flat combs be fed into cooperative relation with the offsetting mechanism in proper position and the apparatus is provided with means so that if a comb is inadvertently fed in reversed position, breakage of the parts will not result. This safety means constitutes a novel feature of this invention.

Features of the invention, other than those specified, will be apparent from the hereinafter detailed description and claims, when read in conjunction with the accompanying drawings.

The accompanying drawings illustrate one practical embodiment of the invention, but the construction shown therein is to be understood as illustrative, only, and not as defining the limits of the invention.

Referring to the drawings, 1 designates an endless conveyor which is mounted to continuously travel about pairs of directional gears, 2, 3, 4, 5, 6, 7, 8, 9 and 10, positioned at opposite sides of the machine and any one or more of which gears may be driven for the purpose of imparting movement to the conveyor. The gears 5 are loose gears which are supported in a loop in the conveyor, as hereinafter described, but the remaining gears are supported, in part, by a suitable frame 12 and on additional frames and hangers to maintain said gears in proper spaced relation. In practice, the conveyor is made of considerable length and the gears 9 are spaced at a much greater distance from the gears 8 and 10 than as shown in the drawings in order that after the heading operation, the matches will travel for a sufficient time on the conveyor to permit of the drying of the material of which the match heads are formed, before the combs are discharged from the machine.

Figures 8, 9:
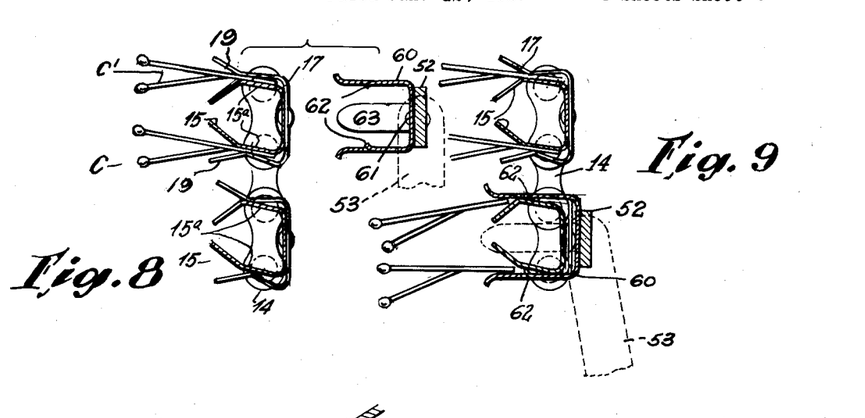
Figure 8 is a detailed section through the conveyor showing two match combs in place therein and the comb ejector in normally retracted relation thereto.
Figure 9 shows the ejector in the act of ejecting the combs from the conveyor.
Figure 10:
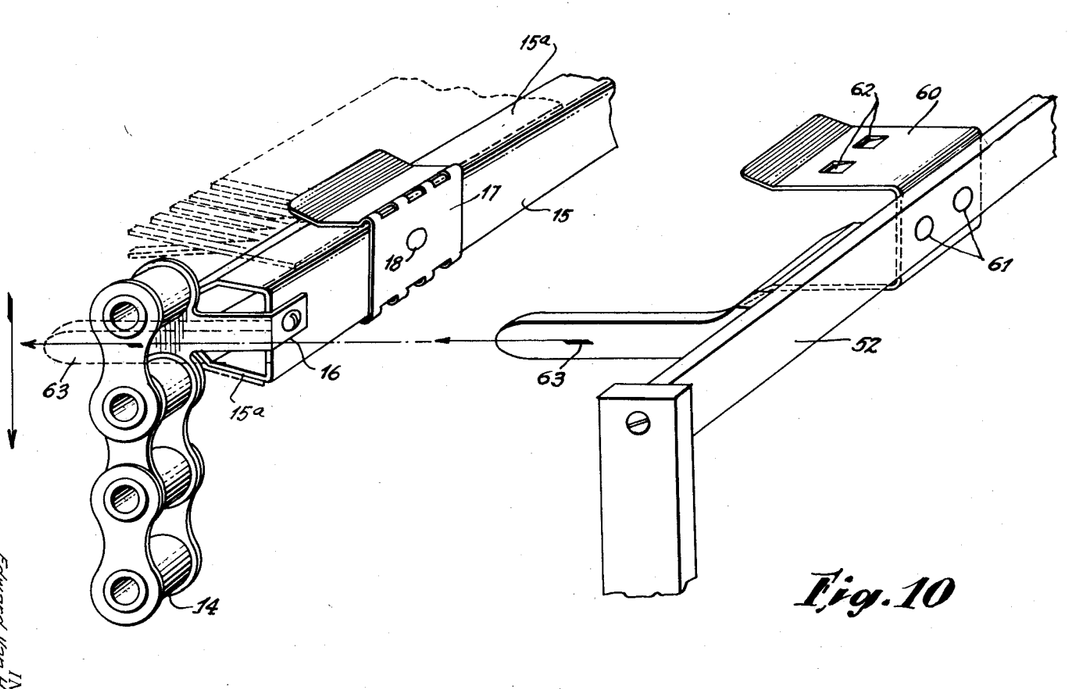
Figure 10 is a fragmental perspective illustrating the normal relationship between the ejector and the conveyor.

The conveyor, as shown best in Figures 8 to 10, embodies two chains 14 which cooperate with the gears 1—10 and these gears are duplicated at both sides of the machine so as to provide a mounting for the two chains 14 in lateral spaced relation. Extending transversely between the chains at spaced intervals longitudinally thereof are comb carriers 15. These carriers are of rigid construction and they are rigidly secured at their opposite ends to the respective chains by means of brackets 16, shown in Figure 10. The upper and lower surfaces 15a of the carriers are flat and are substantially parallel to one another, but their forward edges are bent inwardly, as shown best in Figs. 8 and 9. It will be further noted from these figures that the surfaces 15a are inclined, the purpose whereof will presently appear.

Associated with each carrier are a plurality of spring clips 17, these clips being spaced longitudinally of the carriers and secured thereto by means of rivets 18. There are usually four spring clips to each carrier and they are so formed that they will embrace the upper, lower and rear faces 15a of the carriers and form therewith resilient clamps adapted to receive match combs. In order to facilitate the introduction of the combs into gripping relation with the clips, the free edges of each clip are flared outwardly, as shown at 19, so as to provide with the carriers flared or reentrant mouths which serve to guide the match combs into gripping relation between the clips and the carrier. Two of such combs, designated C and C', are shown in gripped position in Figure 8.

It will of course be understood that the combs are held in this position by the resiliency of the spring clips and that while this resiliency is of sufficient degree to preclude inadvertent disengagement of the combs, it is such as to permit the combs to be readily inserted in or removed from said clips.

The match combs to be mounted on the conveyor are adapted to be positioned, by hand or mechanically, in a plurality of magazines positioned in proximity to the conveyor. Any number of these magazines may be employed without departing from this invention, but two, designated 20 and 20a, are shown in the accompanying drawings.

The combs are placed in the magazine in the form of stacks and each comb is slit to form the matches or splints prior to its introduction into the magazine. The splints are, however, not offset at this time, but, in contradistinction, the combs are perfectly flat, so that they will stack readily within the magazines and will feed by gravity to the lower end of each magazine.

Associated with the lower end of each magazine is a feeding device. The feeding device for each magazine embodies a slide 21 mounted for reciprocation on a suitable guide 22 and adapted, by such reciprocating motion to feed the combs one at a time from the bottom of the stack in the direction to the right, as viewed in Figures 2 to 4. A slot is provided at the base of the magazine through which the combs can individually exit when fed by the slide.

The slide is connected by means of a link 23 to one arm of a bell crank 24, the other arm of which carries a follower 25 which bears against a cam 26. This cam is fixed on a shaft 27 which extends eccentrically through the cam, so that by the operation of the shaft, the cam is caused to reciprocate the slide 21. As the slide is moved to the right in Figure 3, the lowermost match comb is slid from the bottom of the stack through the outlet slot in the magazine 20 into cooperative relation with offsetting means, and the throw of the cam 26 is such that when the slide reaches the forward terminal of its movement and is thereupon retracted, it will leave this match comb in cooperative relation with the offsetting means. This means consists of a forming die 28 embodying a plurality of depending fingers 29, as shown best in Figures 5 and 6, these fingers being of a width corresponding to the width of a match splint and spaced a corresponding distance apart.

The forming die is carried at the free ends of a pair of arms 30 which are mounted on fixed pivots 31 carried by the frame 12 and movement is imparted to the arms 30 by means of a link 32 connected to an arm 32a. This arm is tight on a shaft 32b and on this shaft is mounted a loose arm 32c. On the arm 32a is a bracket 32d which is rigid with said arm and between this bracket and the arm 32c is interposed a tension spring 33. The free end of the arm 32c carries a cam follower 34. This cam follower cooperates with a cam 35 fixed on the shaft 27.

The purpose of interposing the spring 33 between the arms 32a and 32c through which the forming die is operated, is to preclude damage to the operating parts of the machine, if the comb is fed in reversed position. It will be apparent that if an unslotted portion of the comb were presented to the forming die, that the forming die would either have to cut or some part of the machine would have to break. By the use of the spring 33, the interposition of a reverse comb between the die and the plate 37 will cause no damage to the machine as the spring will permit the die to remain in a semi-retracted position while the cam 35 completes a cycle.

Figures 3, 5, 6:
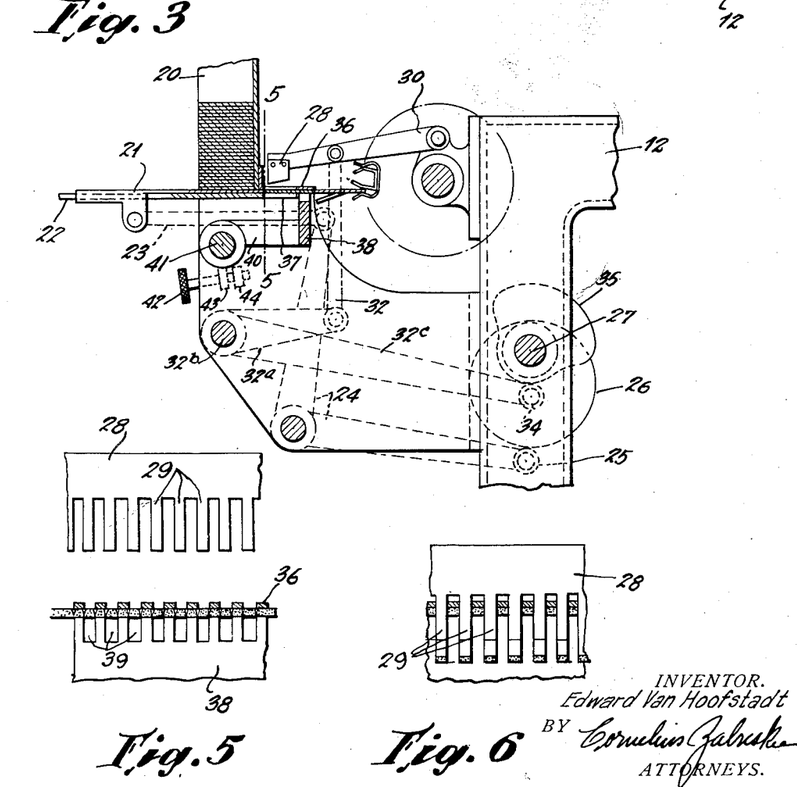
Figures 3 and 4 are fragmental sections illustrating the comb feeding and offsetting means, the former figure showing the parts in position to permit the feeding of a comb to the offsetting means, while the latter figure shows the offsetting means in the process of offsetting the splints of the comb.
Figure 5 is a section on the line 5—5 of Figure 3.
Figure 6 is a section on the line 6—6 of Figure 4.

When the match comb is fed by the slide 21 into cooperative relation with the forming die 28, it comes to rest in a position underlying the die and between upper and lower holding plates 36 and 37 which are slotted, as shown in Fig. 5, so that the slots in these plates will be juxtaposed with the fingers 29 of the forming die.

Figure 4:
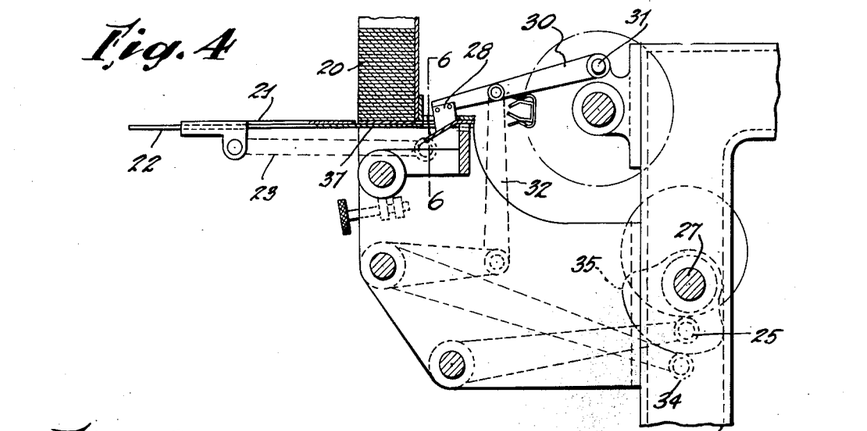

The cams 26 and 35 are so timed that as the slide is retracted, the forming die is lowered, and the fingers 29 thereof pass downwardly through the slots in the plate 37, thereby effecting the offsetting of alternate splints of the comb, the parts at the conclusion of this operation being as shown in Figure 4.

In the continued operation of the machine, the die 28 is raised or retracted and the slide moves forward for the next feeding operation. By this forward movement, it advances the next match comb through the outlet slot of the magazine and in feeding said comb into cooperative relation with the offsetting means, it forces the previously offset match comb into cooperative relation with the carrier after the manner shown in Figure 3. In other words, the feeding of each comb brings about a movement of the preceding comb into gripping relation with the spring clips of the carrier. In practice, the carrier preferably moves intermittently at the feeding stations, and the parts are so timed or synchronized that a carrier will be at rest in a position to receive the comb as it is fed thereto.

It is desirable for the best results that the splints of the comb be offset uniformly and means is provided to insure such uniformity. This means embodies a bar 38 which extends transversely of the machine beneath the plate 37 and the upper edge of which bar is castellated, as shown best in Fig. 5. The slots 39 of the castellations are juxtaposed with the slots in the plate 37 and said bar 38 is supported on brackets 40 fixed to a rock shaft 41. A thumb screw 42 threads through a lug 43 rigid with the bracket 40 and is secured against longitudinal movement in a lug 44 on the frame of the machine, so that by manipulating the thumb screw, the bar 38 may be raised or lowered. By positioning the bar as described, the offset splints of the comb pass through the slots 39 as the comb is fed from forming position into cooperative relation with the conveyor, and said offset splints drag over the bases of the slots 39. In practice, these splints are offset a little more than necessary during the offsetting operation and are brought into proper offset positions by the process of causing them to wipe over the bases of the slots. Accordingly, the degree of offset is the offset comb as it enters the conveyor, will depend upon the adjustment of the bar 38 and I am thereby enabled to obtain uniform offset of the splints and I can also regulate this offset to the extent necessary to insure maximum efficiency during subsequent dipping or heading of the matches.

Figure 2:
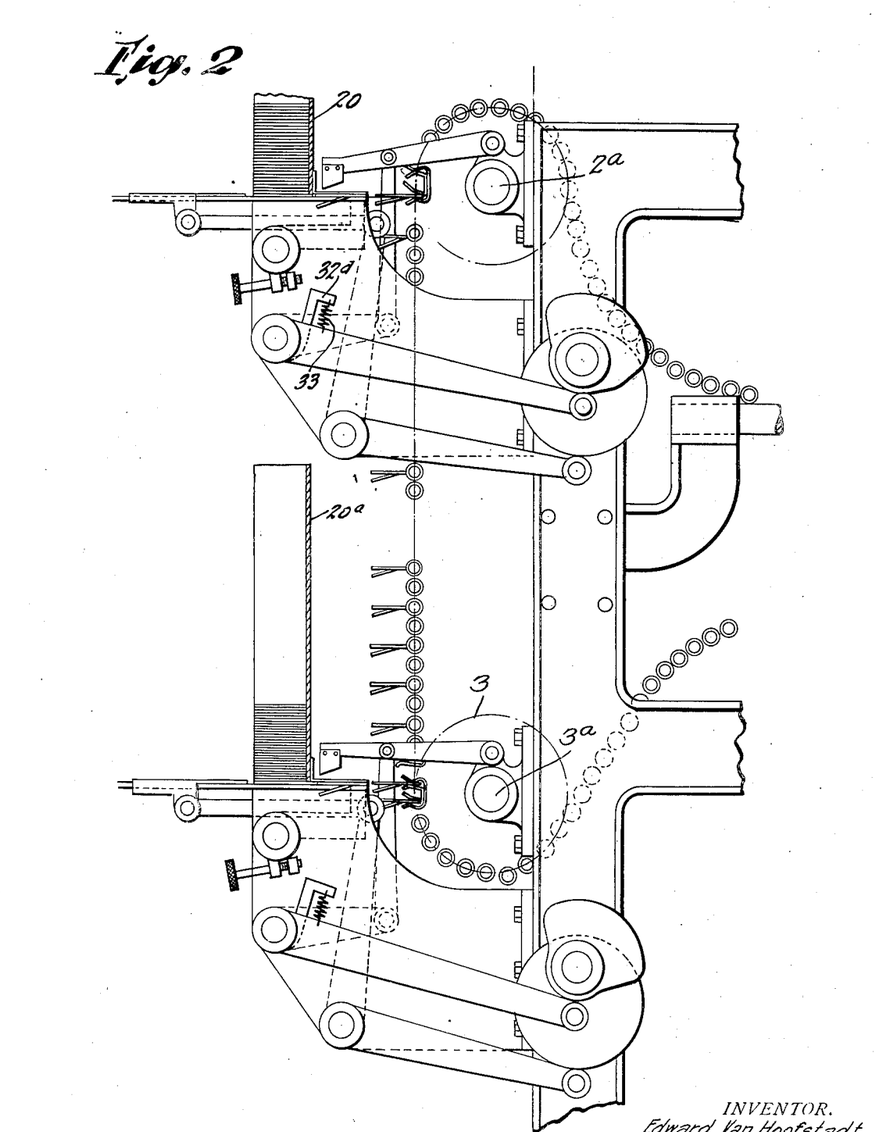
Figure 2 is an enlarged fragmental side elevation of the feeding end of the machine showing the feed magazines in section.

As hereinbefore stated, there are two feed magazines 20 and 20a associated with the machine, as shown in the drawings, and feeding and offsetting means of the character described in connection with Figs. 3 to 4 are associated with each of these magazines, as clearly shown in Fig. 2. These two sets of magazines, however, are so timed and positioned that they will feed interspaced portions of the conveyor. This is apparent from Fig. 2, wherein the combs from the upper magazine 20 are shown as fed to the lower spring clips of the consecutive carriers, while the combs from the lower magazine 20a are fed to the successive upper spring clips of the carriers. To allow for this operation, the conveyor is caused to travel at such timed speed with respect to the feeding devices that each feeding device will feed alternate spring clips. That is to say, the upper feeding device will serve to charge alternate spring clips of the conveyor as the conveyor passes this feeding mechanism and as the conveyor passes the lower feeding mechanism, match combs will be fed or introduced into the intermediate clips.

It will be apparent that in order to efficiently feed match combs to the conveyor, the conveyor should be at rest at the feeding stations when the combs are moved into engagement with the comb carriers. Moreover, if it is attempted to intermittently operate the entire conveyor the inertia due to the very considerable weight of the conveyor is such that the intermittent operations must necessarily be relatively slow. As a matter of fact, the intermittent operation of a conveyor of the character under consideration would require it to be operated so slowly that the output of the machine would be relatively small.

I have found, however, that it is entirely practical and highly efficient to operate that portion of the conveyor adjacent the feeding stations intermittently and to actuate the remainder of the conveyor continuously. In other words, the greater portion of the conveyor moves continuously while at the feeding stations, it is adapted for intermittent movement. This result is capable of accomplishment by using a conveyor a little longer than would be necessary if the entire conveyor were operated continuously and by forming in advance of the feeding stations a loop 11 and beyond the gears 4 a loop 5a. Loops are thus formed in advance of and after the feeding stations, so that the conveyor can be fed continuously into the loop 11 and continuously out of the loop 5a, while the loop 11 may be intermittently taken up and fed to the gears 2 and intermittently discharged beyond the last feeding station over the gears 3 and 4. There is thus a relatively small portion of the length of the conveyor moved intermittently, while the greater remaining portion moves continuously. The loose gears 5 hang or are supported in the loop 5a and their weight serves to stabilize the feed of the conveyor to the paraffining apparatus hereinafter more fully explained.

Figures 7, 7A:
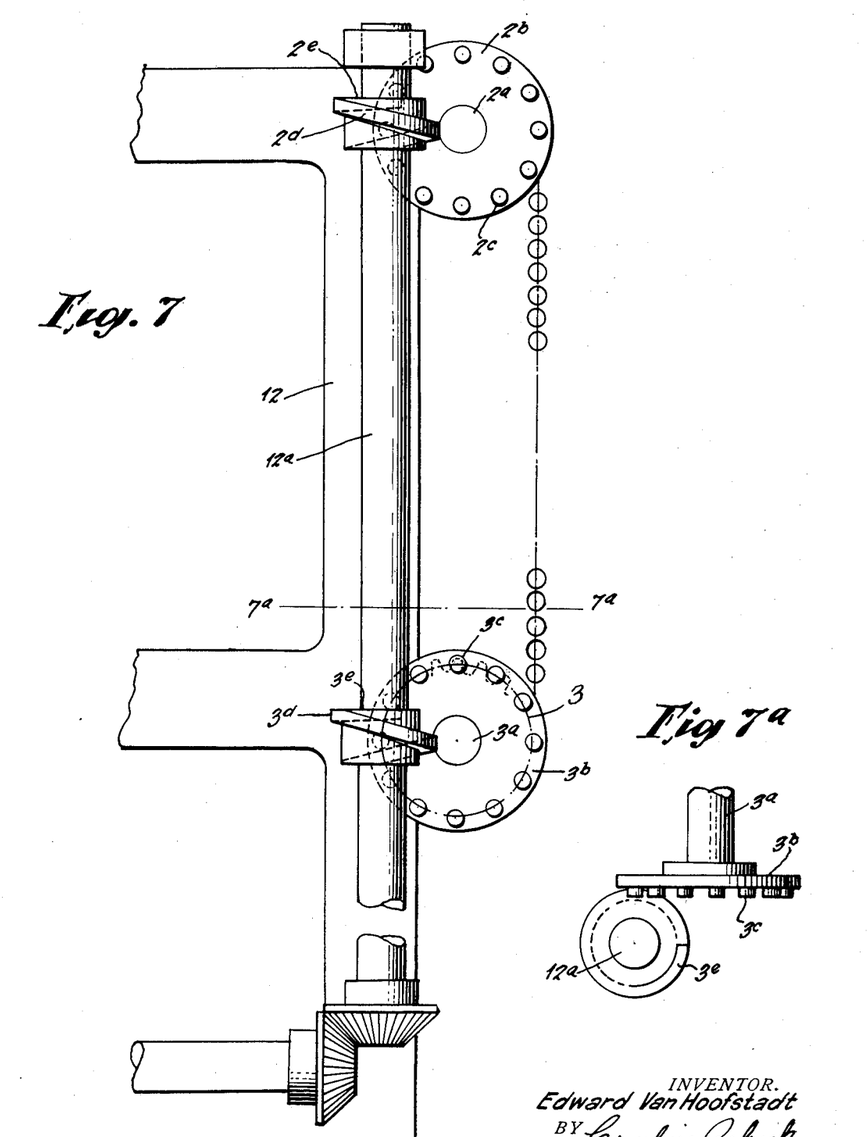
Figure 7 is a side elevation showing in a more or less diagrammatic manner, the mechanism by which the conveyor is intermittently operated at the feeding stations.
Figure 7a is a fragmental plan view on the line 7a—7a of Figure 7.

Suitable mechanism is provided for intermittently operating the gears 2 and 3 to produce the intermittent movement of the conveyor to which reference has been made, and while this apparatus may vary without departing from the spirit of the invention, a very satisfactory form of mechanism is shown in Figures 7 and 7a. In these views, 2a is a shaft on which the gears 2 are mounted and 3a is a shaft on which the gears 3 are fixed. These shafts carry respectively pin wheels 2b and 3b, which have laterally extending roller teeth 2c and 3c, which are adapted to cooperate with worms 2d and 3d fixed on the shaft 12a extending vertically of and supported on the frame 12. The shaft 12a is driven in proper synchronized relation to the feeding mechanism at the several feeding stations through beveled gears, as shown in Figure 7, or otherwise, and the worms 2d and 3d are configurated to rotate the shafts 2a and 3a intermittently with periods of rest or dwell while the flat portions 2e and 3e are in engagement with the teeth of the pin wheels. It is while the shafts 2a and 3a are at rest, that the feeding of the match combs occurs and after the feed is completed, the respective helices immediately act upon the next succeeding teeth of the pin wheels to advance the conveyor one step. The arrangement is such as to present alternate clips to the respective feeding stations in succession, so that after the last feeding station is passed, all the clips of the conveyor will be fully charged with combs ready for the paraffining and heading operations.

The importance of this manner of feeding the conveyor will be apparent to those skilled in the art and it will be manifest that this mode of operation greatly expedites the conveyor feed and permits the conveyor to be run at substantially twice the speed at which it can be run if it were charged at but a single point. The result of this arrangement is that the output of the machine is doubled. The drawings show two feeding stations, but more than this number may be utilized without departing from this invention.

As the conveyor passes the lower feeding station 20a, it is completely charged and as it travels along the match combs are successively impregnated with the paraffine and thereafter headed. The impregnation of the splints with paraffine is accomplished by depressing the conveyor slightly, as shown at 45, while it is travelling over a path of paraffine 46, preferably kept in liquid condition by any suitable heating means. As the match combs are carried along in proximity to the paraffine bath, they are submerged to such degree as it may be desired to impregnate the splints, and after passing through the bath, continue to travel to the heading mechanism.

Figures 12, 13:
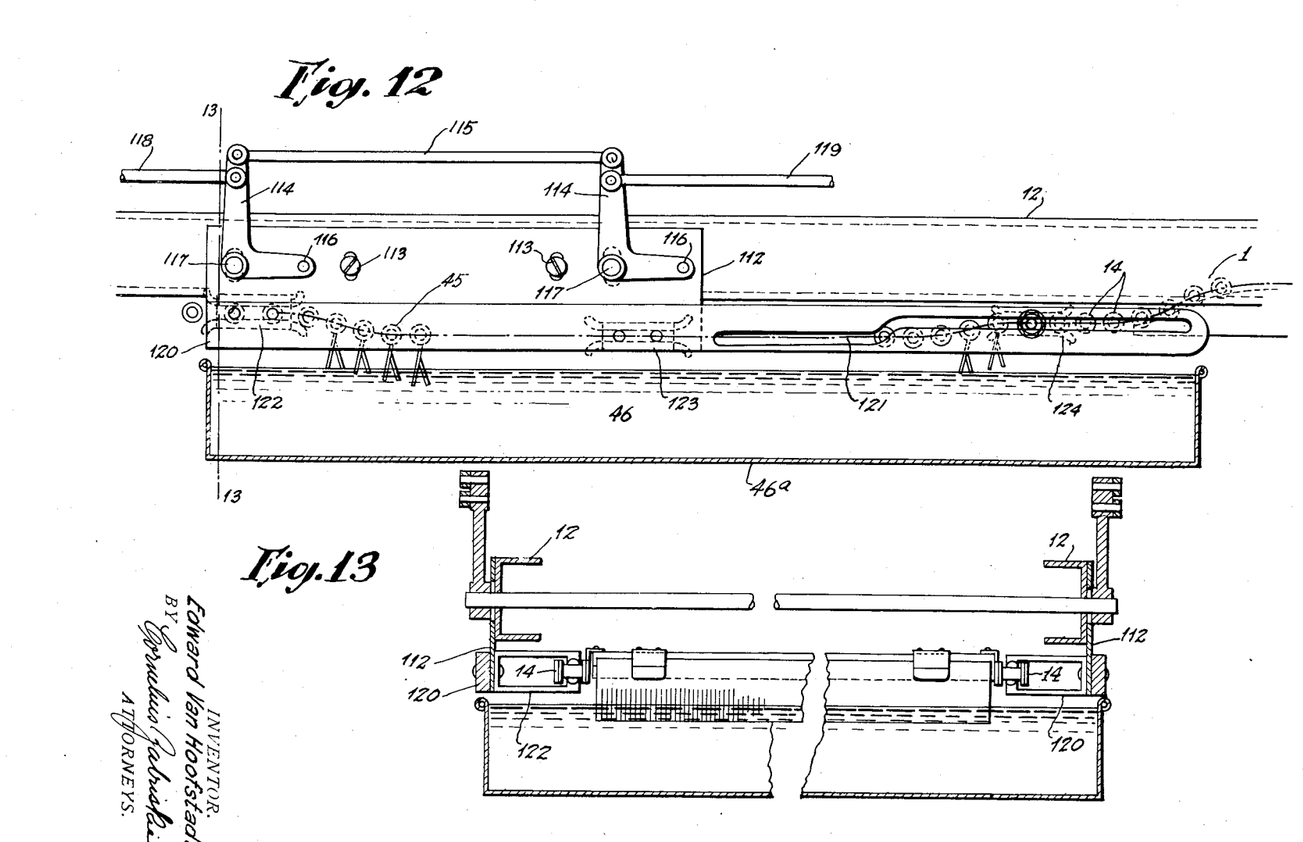
Figure 12 is a side elevation partly in section showing the mechanism by which the length of time during which the matches are dipped in the paraffine is regulated.
Figure 13 is a section on the line 13—13 of Figure 12.

It is found in practice that different conditions of temperature, paraffine and paper require different periods of submersion in order to effect proper paraffining of the splints. Moreover, atmospheric conditions play an important part in this operation. For example, a damp day, the paper of which the match combs are formed may take up considerable moisture which retards the impregnation of such paper with the paraffine, and it is therefore highly desirable from a practical standpoint to provide means whereby the time of subjecting the splints to the impregnating action of the paraffine may be controlled. Very satisfactory means for accomplishing this result is shown in Figures 12 and 13. Here the paraffine is shown as contained in a vessel 46a mounted in any suitable and convenient manner below the frame 12 of the machine, and directly adjacent the path of the conveyor.

Positioned at opposite sides of the frame 12 above the vessel 46a are a pair of carrier plates 112 which are mounted for vertical adjustment on studs 113, threaded into the sides of the frame and working through elongated vertical slots in the carrier plates. Bell cranks 114 are pivoted to the opposite sides of the frame at their elbows. The power arms of these bell cranks are connected by links 115 and the work arms are pivotally secured to the carrier plates at 116. The arrangement described is duplicated at opposite sides of the machine, and the shafts 117 which constitute the pivots of the bell cranks extend transversely across the frame and rigidly connect each pair of bell cranks for simultaneous operation, so that when one bell crank is operated all of them are simultaneously operated in the same manner and to the same extent. Movement is imparted to the bell cranks by a link 118 which extends to any suitable and convenient point of manipulation, while a link 119 connects the bell crank movement to a similar movement associated with the match heading apparatus, as hereinafter more fully explained. This latter link may contain a turn buckle or other suitable means for varying its length in order that the paraffining and heading mechanisms may be properly coordinated.

Figure 14:
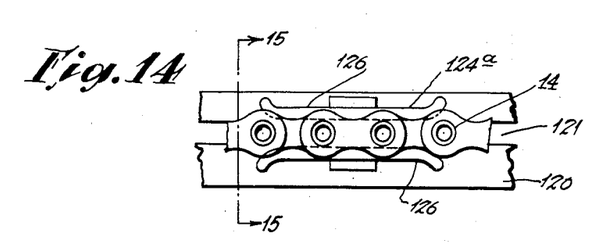
Figure 14 is a detail front view of one of the conveyor supporting elements entering into the construction of Figures 12 and 13.
Figure 15:
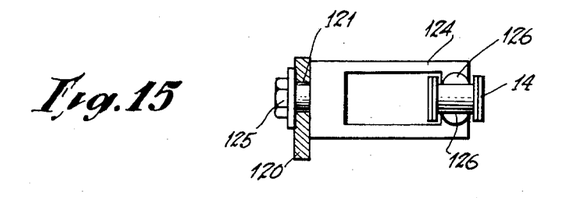
Figure 15 is a section on the line 15—15 of Figure 14.

The carrier plates 112 extend below the frame and support hangers 120, which extend longitudinally below the frame and have formed therein guide slots 121. On each hanger 120 and spaced longitudinally thereof, so as to extend in an inward direction, are a plurality of guide members 122, 123 and 124, arranged in pairs at the opposite sides of the machine. The guide members 122 and 123 are fixed with respect to the hangers, but the guide members 124 are adjustable longitudinally of the hangers in the slots 121, as shown for example in Figure 15, in which it will be noted that the tightening of the nut 125 will lock the guide member against longitudinal shifting in the slot 121. These guide members embody spaced apart shoes 126, the spacing thereof being such that the roller portions of the chains 14 of the conveyor may readily slide between said shoes, as shown in Figures 14 and 15.

As the conveyor is passing over the pool of paraffine, it is guided by the guide members 122, 123 and 124 and the duration or period of time during which the splints of the combs extend into the paraffine may be regulated by shifting the guide members 124 longitudinally of the slots 121, so as to cause the splints to be withdrawn from the pool at an earlier or later time in the travel of the conveyor with respect to said pool. In other words, it will be apparent that the positioning of the guide members 124 at the extreme right end of the slots 121 in Fig. 12 will permit of a maximum time of immersion and that this time will be shortened if said guide members are shifted to the left. This adjustment may be readily and simply accomplished to suit conditions.

Aside from the adjustments of the guide members 124 to lengthen or shorten the period or duration of time of paraffining the splints, it will of course be apparent that the extent of submersion may be controlled by manipulating the rod 118 to bodily raise or lower the hangers as occasion may require.

By the means which I have described with reference to the paraffining operation, it will be apparent that the operator of the machine can effect the desired control or regulation of the parts to obtain just the exact degree and time of submersion as will give the most efficient results for prevailing conditions.

Figure 1:
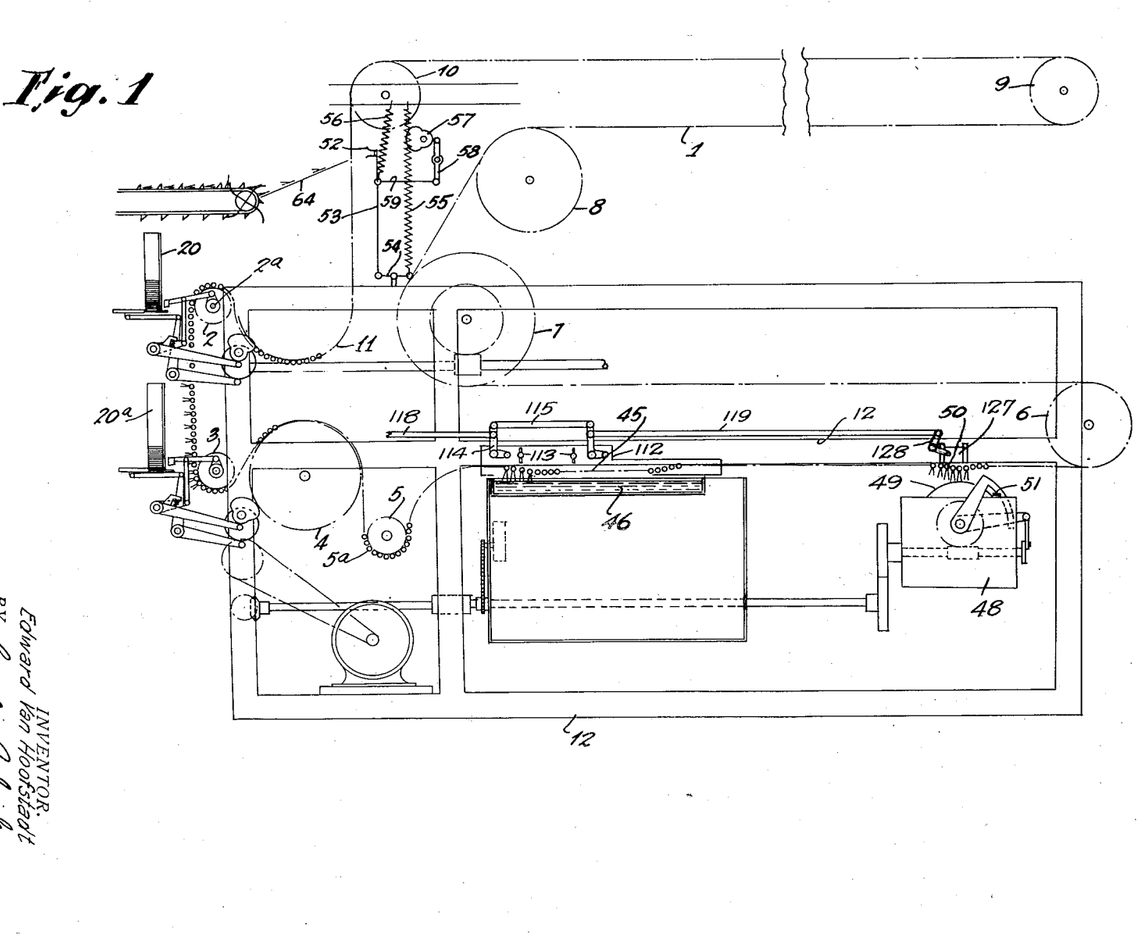
Figure 1 is a diagrammatic view showing the machine of the present invention in side elevation, separate parts being shown in section in the interest of clearness.
Figures 11, 16:
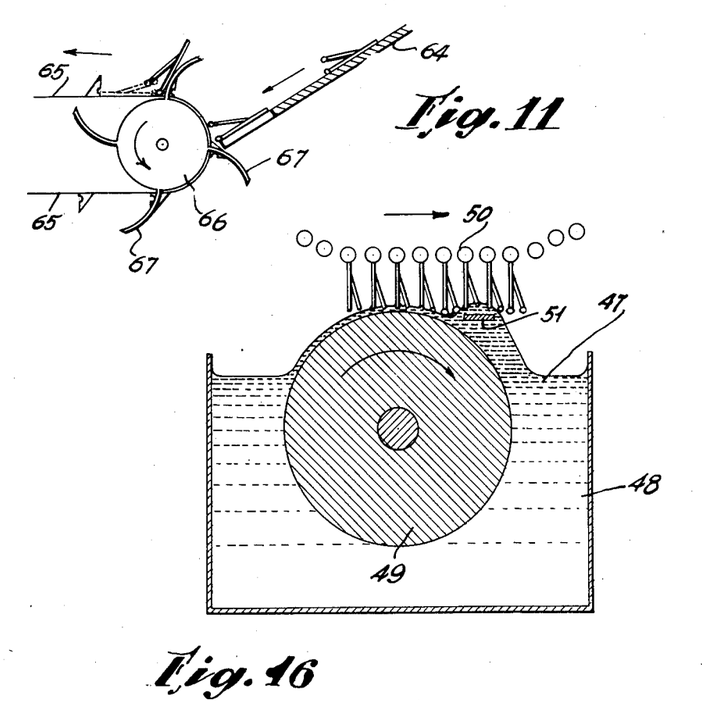
Figure 11 is a fragmental view of match reversing means associated with the discharge end of the machine.
Figure 16 is a sectional view illustrating the manner in which the heading of the combs is carried on; and, Figure 17 illustrates, in side elevation, the mechanism by which the length of submersion of the match tips in a heading solution is controlled.

The heading mechanism is shown best in Figs. 1 and 16. The heading material 47 is contained within a suitable tank 48 in which is positioned a feed roll 49. The roll 49 is immersed for a greater portion of its diameter within the material and is rotated in the same direction as the direction of travel of the match combs and preferably at a slightly higher speed than the match combs travel. The conveyor is adjustably depressed, as shown at 50, in proximity to the roll 49, so that as the combs travel in juxtaposition with the roll 49, they dip into the heading material 47, which is carried in a relatively thick layer over the roll, as shown in Figure 16. The movement of the roll at a slightly greater speed than the combs are traveling causes a slight building up of the material at the back of the splints and insures a more efficient heading thereof.

A relatively stationary bar 51 is positioned at a short distance beyond the roll 49 and in the path of the match combs. This bar extends in a direction parallel to the axis of the roll and is sufficiently close to the roll to cause a building up of the heading material, as it flows over the bar 51, as clearly shown in Figure 16. The flow of such material over the bar is, however, at a considerably slower speed than the speed of the roll, and as a result of this difference in speed, the material will drag on the splints as they pass over and leave the bar 51. It is not to be understood that the splints actually contact with the bar, but inasmuch as their tips are submerged in the slowly moving material above the bar, the drag to which I have referred occurs, and practice has demonstrated that this operation will satisfactorily preclude double heading of match combs. In other words, the splints will be individually headed and heading material will not extend between adjacent splints.

The double heading of the splints of a match comb has long been recognized as a serious problem in the making of book matches, and attempts have been made to overcome this difficulty by the use of complicated apparatus which have not fully satisfied requirements. The simple mechanism which I have shown successfully accomplishes the desired end in a thoroughly efficient manner. In practice, the bar may be mounted for adjustment as circumstances may require on thumb screws or otherwise in order that it may be regulated to give best results.

I consider the utilization of the bar 51 for the building up of a slow moving body of heading material to be of pronounced practical importance and also consider the method here involved as part of this invention.

Figure 17:
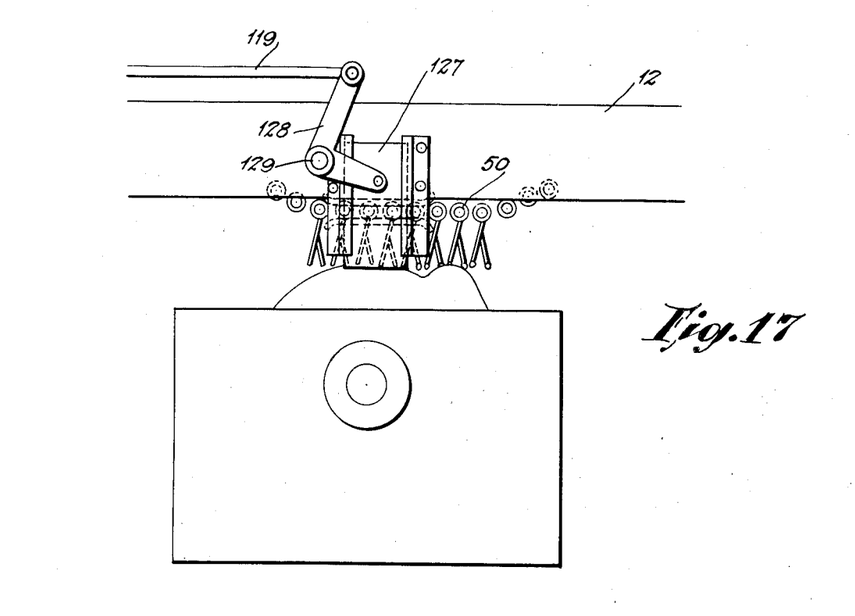

It is found in practice desirable to provide means for controlling the depth to which the match splints are dipped into the heading solution and at the point 50 where the conveyor is depressed. I have referred to this depression as being adjustable and the mechanism whereby this is accomplished is shown in Figure 17. Here the vertical slide 127 is shown as mounted at each side of the frame 12 and each of these slides carries a guide member 124a through which the chains 14 of the conveyor are adapted to travel. With each slide is associated a bell crank 128 pivoted at its elbow on a shaft 129 which extends across the machine and carries a bell crank at the other side. The power arm of the bell crank is secured to the link 119 by which it is connected to one of the bell cranks 14 of the paraffining means. Manipulation of the rod 119 will raise or lower the guide members 124a and control the extent to which the splints are dipped into the heading composition.

Reference has been hereinbefore particularly made to the fact that only alternate splints of the comb are offset, while the intermediate splints remain in the plane of the base of the comb. I have pointed out that this method of offsetting the combs is desirable in the interest of simplicity.

Reference has also been made to the fact that the substantially parallel surfaces 15a of the carriers 15 are inclined as shown more particularly in Figs. 8 to 10. These structural peculiarities are calculated to, and in practice, compensate for the offsetting of the comb in the manner described and insure uniform dipping of all of the splints in the paraffine and heading composition.

By inclining the surfaces 15a as described, each comb, when dipped, occupies a position wherein the angle between the respective splints of said comb will be bisected by a vertical plane passed through the apex of the angle. It necessarily follows that all of the splints will therefore depend to the same distance below the frame of the machine and consequently all of them will be submerged in both the paraffining and heading materials to exactly the same extent. Thus, by the mere fact of proper positioning of the combs relative to the conveyor, uniform dipping is obtained. This is an important feature of the present invention.

The combs after passing through the heading operation, as described, are carried along by the conveyor for such period or duration of time as will permit the heading material to dry sufficiently to permit the combs to be handled without damage to the heads thus formed. In practice, the conveyor may pass, beyond the heading apparatus through a suitable drying chamber to which heated air is supplied to expedite the drying of the heads. I have not considered it necessary however to show such a drying chamber, since, in practice, the conveyor may be made sufficiently long to permit of the drying of the heads under atmospheric conditions. In any event, the headed combs are brought in due course to the discharge point of the conveyor, which, as shown in the drawings, is between the gear 10 and loop 11. At this point, the combs are successively discharged from the apparatus, preferably two at a time by the ejector mechanism which will next be described.

Extending across the machine back of the conveyor at a point between the gear 10 and loop 11 is an ejector bar 52. This bar is secured at its opposite ends to the upper ends of two operating arms 53. These arms are pivoted at their lower ends to rocker arms 54, which are, in turn, pivoted, intermediate their ends to the frame of the machine. The free end of each rocker arm 54 is connected by a spring 55 to the frame and each operating arm is secured to a spring 56 also connected to the frame. These springs 55 and 56 are so fashioned as to substantially counterbalance the weight of the operating arm, whereby the ejector bar is supported in substantially the desired position on a floating mounting. The operating arms are actuated by a cam 57 and a lever 58 acting through links 59 which are secured to the operating arms and by the operation of the cam 57, the ejector bar is moved toward and away from the conveyor.

On the ejector bar 52 are mounted a plurality of ejectors 60. These ejectors are substantially U shaped and they are secured to the bar 52 by rivets 61 (see Figs. 8-10). In practice, three such ejectors are found to operate with efficiency. They are of a shape substantially the same as the spring clips 17 and they are mounted on the bar 52 in such position as to be spaced intermediate the spring clips of the carriers, so that when the ejector bar is moved forwardly toward the carrier, a continued movement of said bar will cause the ejectors to straddle the carriers between the spring clips of the latter, as shown in Fig. 9. The ejectors 60 preferably have sufficient inherent resiliency to adapt themselves for slight unevenness in the shaping of the carriers and for slight variations on the thickness of the match combs supported on said carriers.

Each of the ejectors is, moreover, provided, as shown best in Figs. 8-10, with upset pusher fingers 62, so that when the ejector is moved from the normal retracted position of Fig. 8, into cooperative relation with the carrier, as shown in Fig. 9, these fingers 62 will engage with the rear edges of the combs so that continued movement of the ejector will eject the combs from the spring clips.

It is well known that conveyor chains of the character described will vary in length due to stretching, changes in temperature, wear, etc., and it therefore becomes necessary to provide some means for insuring proper aligning of the ejectors with the carriers during the time that the ejectors are moving into cooperative relation with such carriers. A very convenient and highly efficient means for producing this result is embodied in guiding fingers 63, one of which is mounted adjacent each end of the ejector bar 52 and is shaped and proportioned to pass through toothed openings of the conveyor chains, as shown in dotted lines in Fig. 10. These guide fingers are of such length that when the ejector bar is moved toward the conveyor, the guiding fingers will enter the gear openings in the chains and centralize the ejectors with respect to the corresponding carriers, so that as the ejecting operation is completed, the ejectors will be guided into proper cooperative relation with said carriers and with the match combs mounted thereon.

The floating mounting of the ejector bar makes this operation possible and also permits of a continued movement of the conveyor, during the ejecting operation as the springs of this floating mounting will give to permit the ejector to move along with the conveyor while ejecting the combs and as soon as the ejector is retracted, it will spring back into a position wherein it will be immediately operated to coact with the next following comb carrier. In the absence of a floating mounting for the ejector, it would be necessary to stop the conveyor to eject the match combs therefrom.

As the match combs are ejected from the carriers, they fall upon an inclined table 64 down which they slide by gravity, match heads foremost to a reversing device. The reversing device is associated with the discharge apron 65 which passes about a roll 66 and with this roll is associated a plurality of curved fingers 67. As the book matches slide down the incline table 64, they come to a stop against that portion of the discharge apron which is passing about the roll 66, and immediately they are engaged by the arms 67 which reverse the combs and deposit them on the apron, as shown in dotted lines in Fig. 11. The match combs are carried away from the machine to a suitable point of discharge by the apron 65.

It will of course be understood that all of the parts of the apparatus which I have described are synchronized, so that they operate in proper timed relation for the fulfillment of their respective functions and to this end, the respective mechanisms are geared together by any suitable gearing, the details of which it is not considered necessary to show in the drawings.

I wish to lay particular stress upon the fact that the machine of this invention is capable of a pronounced increase in the output of headed match combs over prior known machines. This is made possible to a large extent through the operation of the major portion of the conveyor at constant speed and operating only a relatively small portion thereof intermittently.

A conveyor of the character under consideration is heavy and if it is attempted to operate the whole conveyor intermittently, relatively great power is required and the parts entering into the construction of the machine must be made very rugged and heavy to withstand the jar, vibration and strains to which such a machine is subjected. However, when the greater portion of the parts operate continuously, as in the present machine, there is a noticeable lack of vibration, relatively little power is necessary for the operation of the machine and the machine works more smoothly and with less strain than could possibly be present if the whole conveyor were intermittently operated.

It is thus possible to operate the constantly moving portion of the belt at a relatively high speed and correspondingly intermittently move a relatively small portion of the belt at a correspondingly high speed. The speed at which the machine of this invention operates of course also depends upon the ability to charge or feed the conveyor rapidly and this is accomplished by feeding such conveyor from different stations and by the utilization of a novel ejector mechanism which I have described.

All the novel features to which reference has been made cooperate in the machine of this invention to produce a smoothly operating structure of high efficiency and capable of an astonishly large output of matches. The machine, as described and shown, constitutes, in effect, only one unit of match making machinery, it being understood that the combs are slit prior to introduction into the machine of this invention and that the headed combs discharged from this machine are manipulated by further apparatus which cuts the combs into book match lengths and encloses such lengths in suitable wrappers to produce the finished book match.

The foregoing detailed description sets forth the invention in its preferred practical form, but the invention is to be understood as fully commensurate with the appended claims.

Having thus fully described the invention, what I claim as new and desire to secure by Letters Patent is:

1. In a match making machine, a conveyor mounted to travel and provided with longitudinally spaced match comb holders, feeding means synchronized with the conveyor to feed the combs to the conveyor, ejector means for thereafter ejecting the match combs from a moving portion of the conveyor, said ejector means having an ejector element floatably mounted for travel with the conveyor, whereby it is adapted for movement with the conveyor while ejecting match combs therefrom, and means for causing the conveyor to continuously travel through the zone of the ejector means.

2. In a match making machine, a conveyor mounted to travel successively past a plurality of feeding stations, a paraffining station, a heading station and an ejector station, means at the several feeding stations for feeding match combs to the conveyor, means at the heading station for applying striking material to the splints of the combs as said combs pass by said station, ejector means at the ejecting station for ejecting the match combs while they move in the zone of said station in succession, means to cause the conveyor to continuously travel through the zone of the ejector means, said ejector means including a resiliently suspended ejector element adapted to be carried along by the conveyor during the ejecting operation.

3. In a match making machine, a conveyor mounted to travel, means for driving one portion of the conveyor intermittently and another portion continuously, means for applying match combs to the intermittently movable portion of the conveyor, means for thereafter applying heads to the splints of said combs, while they are continuously travelling, and means for thereafter ejecting the combs from the continuously driven portion of the conveyor without cessation of movement of the conveyor, said ejecting means embodying a plurality of pushers adapted to engage with the combs to eject them from the conveyor, means for impelling the pushers into cooperative relation with the combs, guiding means coacting directly with the conveyor for guiding the pushers into accurate cooperative relation with the combs, and a spring suspension for normally holding the pushers in position to start the ejecting operation, said spring suspension being yieldable to permit the pusher to travel along with the conveyor as the ejecting operation proceeds to conclusion and serving to thereupon return the pushers to normal initial position with respect to the direction of travel of the conveyor.

4. In a match making machine, a conveyor mounted to travel, means for driving one portion of the conveyor intermittently and another portion continuously, means for applying match combs to the intermittently movable portion of the conveyor, means for thereafter applying heads to the splints of said combs, and means for thereafter ejecting the combs from the conveyor while they are being carried by the continuously moving portion of the conveyor, said ejecting means embodying a plurality of pushers adapted to engage with the combs to eject them from the conveyor, a yieldable suspension to normally support the pushers in position to coact with the combs on the conveyor, means for impelling the pushers into cooperative relation with the combs, and guiding means coacting directly with the conveyor for guiding the pushers into accurate cooperative relation with the combs, said ejector means being thereby floatably mounted to permit of such guiding operation while the conveyor continues to move in proximity thereto.

5. In a match making machine, a conveyor mounted to travel and embodying match comb holders to frictionally support match combs on the conveyor, ejecting means floatably mounted and movable into and out of cooperation with the match holding means of the conveyor, and guiding means carried by the ejecting means and cooperating directly with the moving conveyor for guiding the ejecting means into cooperative relation with the match combs and for coupling the ejector means to the conveyor for movement therewith during the comb ejecting operation, and means for continuously driving the conveyor through the zone of the ejecting means.

6. In a match making machine, a conveyor mounted to travel and embodying a plurality of sprocket chains and match comb holders carried thereby, an ejecting device movable toward and away from the conveyor and provided with at least one guide member positioned to enter the teeth openings of the sprocket chain, when the ejector device is moved toward said conveyor for the purpose of guiding the ejector device into accurate cooperative relation with the match combs.

7. In a match making machine, a conveyor embodying spaced apart sprocket chains carrying match comb holders, an ejector device movable toward and away from the conveyor, means for yieldably supporting the ejector device in a predetermined position with reference to the length of the conveyor, guiding members carried by the ejector device, and means for moving the ejector device into cooperative relation with the conveyor to move the guides into the sprocket openings of the chains and thereby centralize the ejector device with reference to the match holders of said conveyor.

8. In a match making machine, a conveyor embodying spaced apart sprocket chains, match comb holders carried by said chains, and ejecting means movable into cooperable relation with the match holders and provided with projections adapted to enter the toothed openings in the chains to automatically guide the ejecting means into accurate cooperative relation with the holders.

9. In a match making machine, a conveyor embodying spaced apart sprocket chains, match comb holders carried by said chains, ejecting means movable into cooperable relation with the match holders and provided with projections adapted to enter the toothed openings in the chains to automatically guide the ejecting means into accurate cooperative relation with the holders, means for driving at least a portion of the conveyor continuously, means for mounting the ejector means for movement toward and away from the conveyor, and means for mounting the ejector means to permit of its movement toward and away from the conveyor and for movement with the conveyor during the ejecting operation.

10. In a match making machine, a conveyor embodying spaced apart sprocket chains, match comb holders carried by said chains, and means for driving the chains, in combination with an ejector bar extending transversely of the conveyor and carrying thereon a plurality of ejecting members adapted, when brought into proper cooperative relation to the comb holders, to eject the match combs from the latter, projections carried by the ejector bar and extending in the direction of the conveyor in juxtaposition with the chains, and means for moving the ejector bar in the direction of the conveyor to shift the projections into the sprocket openings of the chains, whereby said projections thereafter serve to line up the ejecting members with respect to the match combs supported by the comb holders of the conveyor.

11. In a match making machine, a conveyor embodying spaced apart sprocket chains, rigid carriers extending transversely of the conveyor and supported on said chains, spring clips embracing said carriers and adapted to cooperate with the carriers to frictionally grip and support match combs, an ejector bar extending in a direction parallel to the carrier bars of the conveyor and normally spaced therefrom, ejectors mounted on the ejector bar and adapted by movement of said bar in the direction of the conveyor to straddle a carrier and eject the match combs therefrom, spring actuated means for supporting the ejector bar in a predetermined position, means for moving the ejector bar toward and away from the conveyor, and guiding projections on the ejector bar adapted to enter the sprocket holes in the conveyor chains to accurately line up the ejectors with the carriers when the ejector bar is moved in the direction of the carrier for the ejecting operation.

12. In a match making machine, a conveyor mounted to travel and embodying match comb holders, a magazine positioned in proximity to the conveyor and adapted to contain flat match combs slit to form the splints of the combs, splint offsetting means interposed between the magazine and the conveyor, means for individually feeding match combs from the magazine to the offsetting means, and operable to leave the combs, when in cooperative relation with the offsetting means, in the path of the next feeding operation from the magazine whereby, upon movement of the next comb into cooperative relation with the offsetting means, it will engage with the comb previously fed for the purpose of forcing the latter comb into cooperative relation with the conveyor.

13. In a match making machine, a conveyor mounted to travel and embodying match comb holders, a magazine positioned in proximity to the conveyor and adapted to contain flat match combs slit to form the splints of the combs, splint offsetting means interposed between the magazine and the conveyor, means for feeding the match combs individually from the magazine to the offsetting means and from the offsetting means to the conveyor, and means for manipulating the offset teeth of the combs subsequent to the offsetting thereof to insure uniform of offset.

14. In a match making machine, a conveyor mounted to travel and embodying match comb holders, means for alternately offsetting the splints of a flat slit comb, means for thereafter manipulating the offset splints to insure uniformity of offset, and means for feeding the thus formed and manipulated comb to the conveyor.

15. In a match making machine, a conveyor mounted to travel and embodying match comb holders, means operable upon a flat slit comb to alternately offset the splints thereof, means for thereafter feeding the comb to the conveyor, and means cooperable with the offset splints subsequent to the offsetting thereof and prior to the engagement of the comb with the conveyor to manipulate the offset splints of the comb for the purpose of insuring uniformity of offset.

16. In a match making machine, a conveyor mounted to travel and embodying match comb holders, means operable upon a flat slit comb to alternately offset the splints thereof, means for thereafter feeding the comb to the conveyor, means cooperable with the offset splints subsequent to the offsetting thereof and prior to the engagement of the comb with the conveyor to manipulate the offset splints of the comb for the purpose of insuring uniformity of offset, said manipulating means being adjustable to vary the degree of offset as desired.

17. In a match making machine, splint offsetting mechanism embodying guards spaced apart a distance substantially equal to the thickness of a flat slit match comb, said guards having alined slots therein juxtaposed with alternate match splints of such comb, a non-cutting bending device movable toward and away from said guards and having flat, non-cutting forming fingers adapted to enter the alined slots in the guards to offset the match splints juxtaposed with said slots.

18. In a match making machine, guards spaced apart a distance substantially equal to the thickness of a flat slit match comb, said guards having alined slots therein juxtaposed with alternate match splints of such comb, a forming die movable toward and away from said guards to provide flat forming fingers adapted to enter the alined slots in the guards to offset the match splints juxtaposed with said slots, and means for operating said forming die, said means including a yieldable connection adapted to give in the event that the splints of the comb are not juxtaposed with said slots.

19. In a match making machine, splint offsetting mechanism for previously slit flat match combs, embodying guards spaced apart for a distance equal to substantially the thickness of the flat match comb, said guards being provided with slots positioned to register with alternate splints of the comb and at least one of the guards having a solid portion overlying the base or unslit portion of the comb, and non-cutting forming means movable through said slots for the purpose of offsetting those splints of the comb which are juxtaposed with the slots.

20. In a match making machine, guards spaced apart for a distance equal to substantially the thickness of a flat match comb, said guards being provided with slots positioned to register with alternate splints of a slit comb and at least one of the guards having a solid portion overlying the base or unslit portion of the comb, forming means movable through said slots for the purpose of offsetting those splints of the comb which are juxtaposed with the slots, and driving connections for the forming means and including a yieldable connection adapted to yield in the event that the splints of the comb are not accurately juxtaposed with the slots in the guards.

21. In a match making machine, a conveyor adapted to support and carry match combs along a predetermined path, a roll positioned contiguous to the path of the combs, means for applying a heading substance to the roll in a sufficient amount to cause the combs to dip into such substance as they pass thereover, means for rotating the roll to cause the substance to travel therewith at a greater speed than the speed of the combs, and means positioned beyond the roll and cooperating therewith to build up a body of the heading substance in the path of the combs with the substance at this point travelling at a lesser speed than the speed of the combs.

22. In a match making machine, means for transporting match combs along a predetermined path of travel with the separated splints of said combs depending to a substantially uniform degree, a body of heading substance movable in the same general direction as the combs and flowing at a greater speed than the speed of the combs into and out of contact with the free ends of the comb splints for the purpose of heading the splints, and means positioned further along the path of travel of the combs to intercept said first moving body of heading substance and build up a second body of said substance flowing in the same general direction as the combs are traveling, but at a lesser speed than the speed of the combs to impinge the headed portions of the splints and impose a drag thereon to preclude double heading of said splints.

23. In a match making machine, means for transporting match combs along a predetermined path of travel with the separated splints of said combs depending to a substantially uniform degree, a roll positioned adjacent the path of the splints and immersed in a heading substance, said roll being rotatable to carry the heading substance into engagement with the free ends of the splints as the combs pass by said roll, and a relatively fixed barrier positioned further along the path of the splints in normally spaced relation to the roll to cause a backing up of the heading substance as it flows over said roll and the formation of a body of said substance through which the tips of the splints are required to pass.

24. In a match making machine, means for transporting match combs along a predetermined path of travel with the separated splints of said combs depending to a substantially uniform degree, a roll positioned adjacent the path of the splints and immersed in a heading substance, said roll being rotatable to carry the heading substance into engagement with the free ends of the splints as the combs pass by said roll, a relatively fixed barrier positioned further along the path of the splints in normally spaced relation to the roll to cause a backing up of the heading substance as it flows over said roll and the formation of a body of said substance through which the tips of the splints are required to pass, said latter body of the heading substance moving at a lesser speed than the splints to produce a drag on the splints for the purpose of precluding double heading thereof.

25. Heading apparatus for book match making machines embodying a roll partially immersed in a heading substance and mounted for rotation, and a relatively stationary bar extending substantially parallel to the axis of the roll and positioned in relatively closed spaced relation to the circumference of the roll, whereby the substance caused to flow over the top of the roll by the rotation of the roll will be backed up by the bar and caused to flow over said bar, in combination with means for passing the tip ends of match splints through the backed-up portion of said substance to effect heading of said splints.

26. A conveyor for book match making machines embodying spaced apart sprocket chains, carrier members extending in parallel relation between said chains and supported at their opposite ends thereby, said carrier members being of substantially U shaped cross section, and substantially U shaped spring clips embracing said carriers with the open sides of the carriers and the open sides of the clips facing in the same direction, and the free ends of the clips and the free edges of the carriers being bent into divergent relation to provide reentrant mouths to facilitate the introduction of match combs between the arms of the spring clips and the exterior rigid faces of the carriers.

27. A match comb holding device for match making machines embodying a rigid carrier member of channelled cross section and correspondingly shaped spring clips embracing the channel member and secured thereto with the free ends of the clips and the free edges of the channel member extending in the same direction and oppositely flared to produce reentrant mouths adapted to guide match combs into gripped position between the spring clips and the channeled member and exteriorly of the latter.

28. A match comb holding device for match making machines embodying a rigid carrier member of channelled cross section, the opposite surfaces of which carrier member are substantially parallel, spring clips embracing the carrier member externally and secured thereto with the free end of the clips and the free edges of the channel member extending in the same direction and oppositely flared to produce reentrant mouths adapted to guide match combs into gripped position between the spring clips and the channelled member and exteriorly of the latter, in combination with a conveyor mounted to travel, and means for mounting the channelled member on the conveyor with the opposite surfaces of the channelled member inclined with respect to the plane of the conveyor with both of said surfaces inclined in the same direction.

29. The herein described method of heading match combs which consists in causing match combs to travel along a substantially horizontal path with their splints depending, lifting heading composition from a subjacent pool to form a raised body of such composition into which the tips of the splints dip, causing said raised body to travel with the splints but at a greater speed for a distance and thereupon descend out of contact with the splints in a direction to return to the pool, and interposing an obstacle in the path of the return of the composition to the pool to cause such composition to be backed up sufficiently to form a second raised body flowing to a height substantially the same as the first raised body but at a speed less than the speed of the splints.

EDWARD VAN HOOFSTADT.